United States Patent
Yu et al.

(10) Patent No.: US 8,534,782 B2
(45) Date of Patent: Sep. 17, 2013

(54) SLIDE RAIL ASSEMBLY

(75) Inventors: Mo-Ming Yu, Shenzhen (CN);
Guang-Hua Gu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 204 days.

(21) Appl. No.: 12/982,904

(22) Filed: Dec. 31, 2010

(65) Prior Publication Data
US 2012/0153792 A1   Jun. 21, 2012

(30) Foreign Application Priority Data
Dec. 21, 2010   (CN) .......................... 2010 1 0599050

(51) Int. Cl.
*A47B 95/00*   (2006.01)
(52) U.S. Cl.
USPC ..................................... 312/333; 312/334.46
(58) Field of Classification Search
USPC ............ 312/330.1, 333, 334.1, 334.7, 334.8, 312/334.44–334.47
See application file for complete search history.

(56) References Cited

U.S. PATENT DOCUMENTS

| | | | |
|---|---|---|---|
| 6,655,763 B2 * | 12/2003 | Judge et al. | 312/334.46 |
| 6,817,685 B2 * | 11/2004 | Lammens | 312/334.47 |
| 6,851,773 B2 * | 2/2005 | Chen et al. | 312/334.46 |
| 6,883,884 B2 * | 4/2005 | Chen et al. | 312/333 |
| 6,935,710 B2 * | 8/2005 | Chen et al. | 312/333 |
| 7,404,611 B1 * | 7/2008 | Que | 312/334.46 |
| 2006/0163983 A1 * | 7/2006 | Wu | 312/333 |
| 2006/0244349 A1 * | 11/2006 | Chen et al. | 312/334.47 |
| 2008/0150409 A1 * | 6/2008 | Huang et al. | 312/334.46 |

* cited by examiner

*Primary Examiner* — Matthew Ing
(74) *Attorney, Agent, or Firm* — Altis & Wispro Law Group, Inc.

(57) ABSTRACT

A slide rail assembly includes a first slide rail, a second slide rail, a ball bracket slidably sandwiched between the first and second slide rails, a locking member fixed to the first slide rail, and a positioning member fixed to the second slide rail. The ball bracket is locked to the first slide rail by the locking member. The second slide rail is positioned to the first slide rail by the positioning member. The locking member may be operated to release the second slide rail and the ball bracket from the first slide rail at the same time.

19 Claims, 7 Drawing Sheets

SLIDE RAIL ASSEMBLY

BACKGROUND

1. Technical Field

The disclosure relates to a slide rail assembly.

2. Description of Related Art

A slide rail is used between two objects that can move relative to each other, such as between a desk and a drawer, or a server and a rack. A conventional slide rail assembly for a drawer and a desk includes an outer slide rail mounted to the desk, and an inner slide rail mounted to the drawer. The slide rail assembly may include roller or ball bearings for easier movement. A ball bracket sandwiched between the outer slide rail and the inner slide rail holds the ball bearings. However, the order in which the inner slide rail moves relative to the ball bracket and the ball bracket moving relative to the second slide rail is unpredictable.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
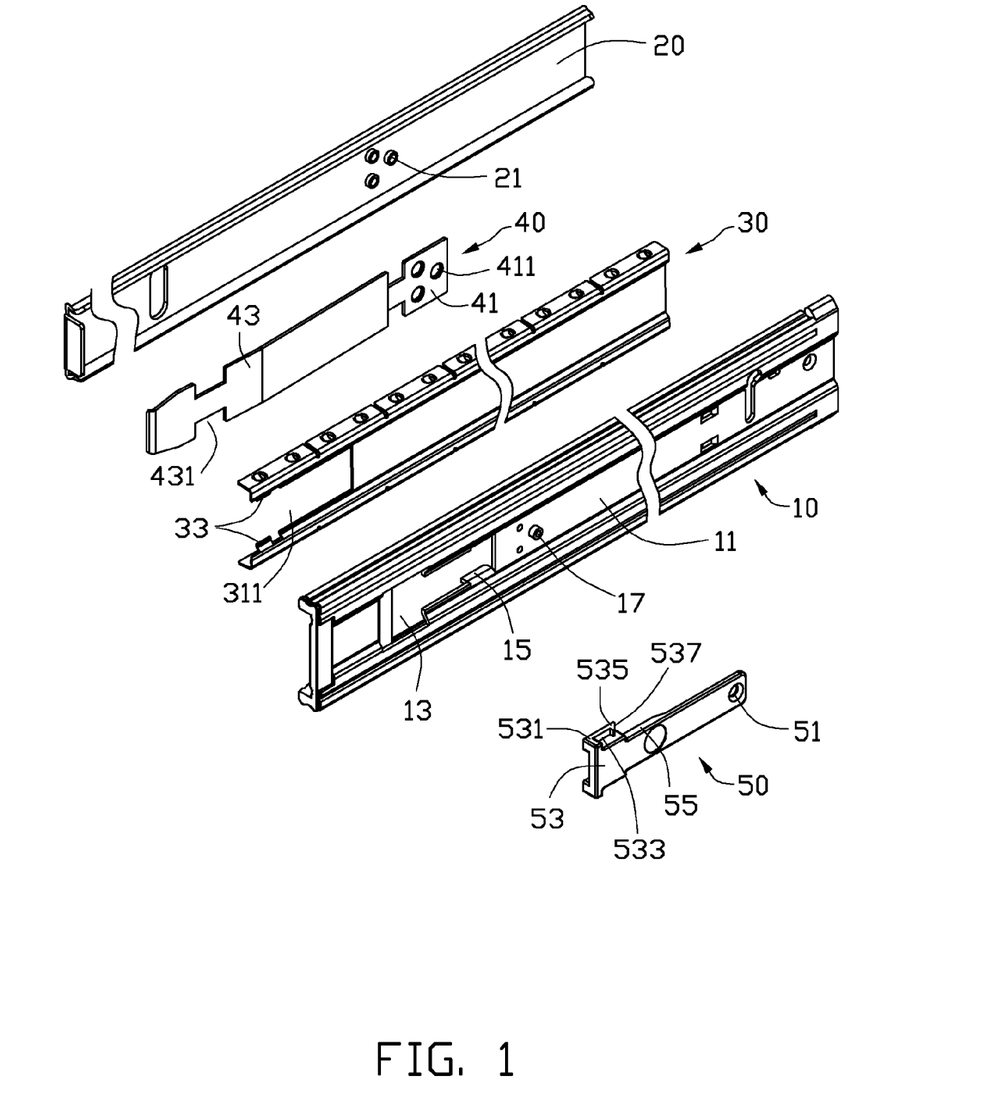
FIG. 1 is an exploded, isometric view of an embodiment of a slide rail assembly.
Figure 2:
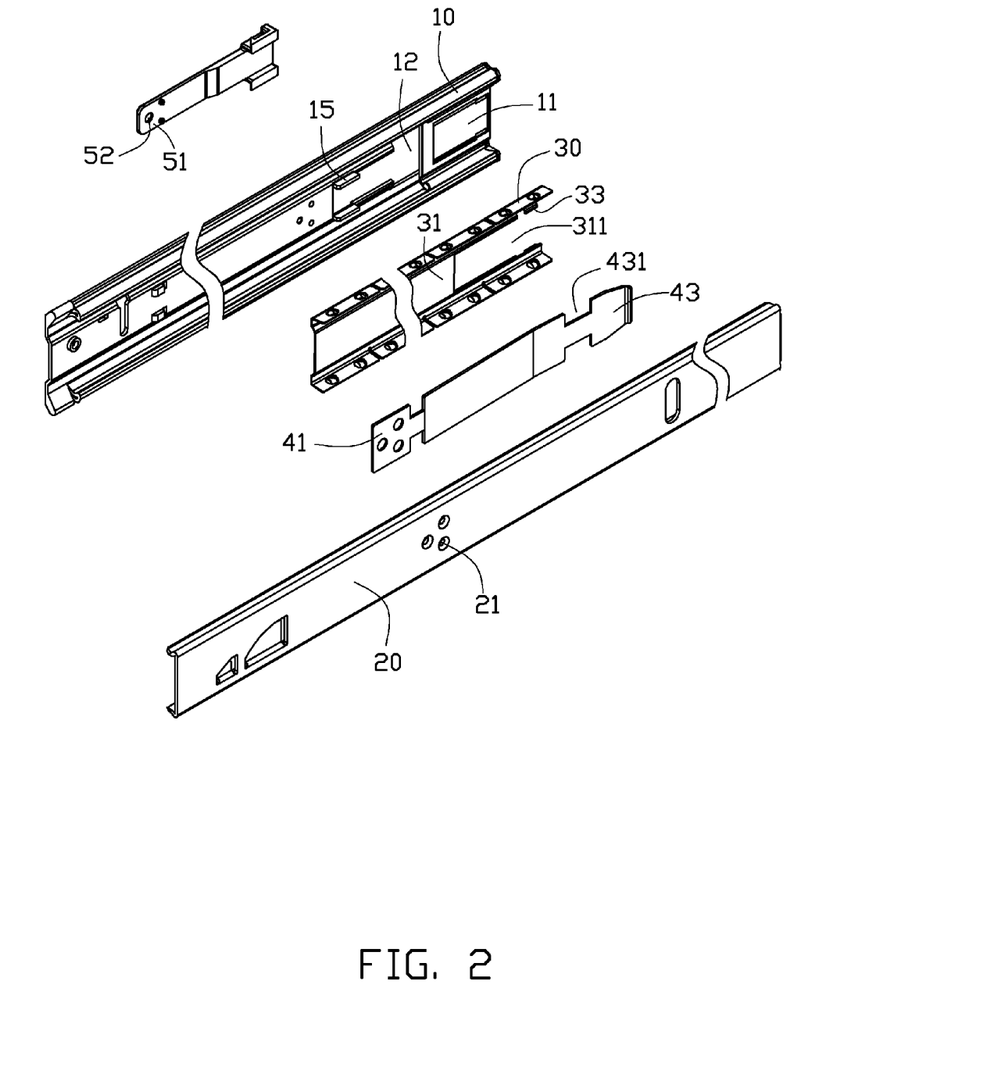
FIG. 2 is similar to FIG. 1, but viewed from another perspective.

Referring to FIGS. 1 and 2, an exemplary embodiment of a slide rail assembly includes a first slide rail 10, a second slide rail 20 slidably attached to the first slide rail 10, a ball bracket 30, a positioning member 40, and a locking member 50.

The first slide rail 10 includes a bottom wall 11 and two sidewalls (not labeled) extending from opposite sides of the bottom wall 11. A through hole 13 is defined in the bottom wall 11 of the first slide rail 10 at a predetermined position. Two stoppers 15 extend inward from the bottom wall 11 adjacent to the through hole 13. A mounting pole 17 protrudes on the bottom wall 11 adjacent to the through hole 13 and opposite to the stoppers 15.

The second slide rail 20 includes a bottom wall (not labeled) and two sidewalls (not labeled) respectively extending from opposite sides of the bottom wall. A plurality of mounting poles 21 is defined on the bottom wall at a predetermined position.

The ball bracket 30 includes a bottom wall 31 and two sidewalls (not labeled) respectively extending from opposite sides of the bottom wall 31. A plurality of holding holes (not labeled) is defined in the sidewalls of the ball bracket 30. An opening 311 is defined in an end of the bottom wall 31 of the ball bracket 30. Two blocking portions 33 extend opposite from the bottom wall 31 of the ball bracket 30.

The positioning member 40 is a resilient piece and includes a mounting portion 41 and a positioning portion 43 formed at opposite ends of the positioning member 40. A plurality of mounting holes 411 is defined in the mounting portion 41. Two rectangular cutouts 431 are defined in opposite sides of the positioning portion 43.

The locking member 50 includes a mounting portion 51 defining a mounting hole 52 and a locking portion 53 formed at opposite ends of the locking member 50, and a press portion 55 defined between the locking portion 53 and the mounting portion 51. Two hooks 531 are defined at opposite sides of the locking portion 53. Each hook 531 defines a locking slot 533 in a middle of the hook 531, opposite to the first slide rail 10, and includes a wedge-shaped protrusion 535 extending from a distal end of the hook 531, opposite to the first slide rail 10. The protrusion 535 has a slanted surface 537.

Figure 3:
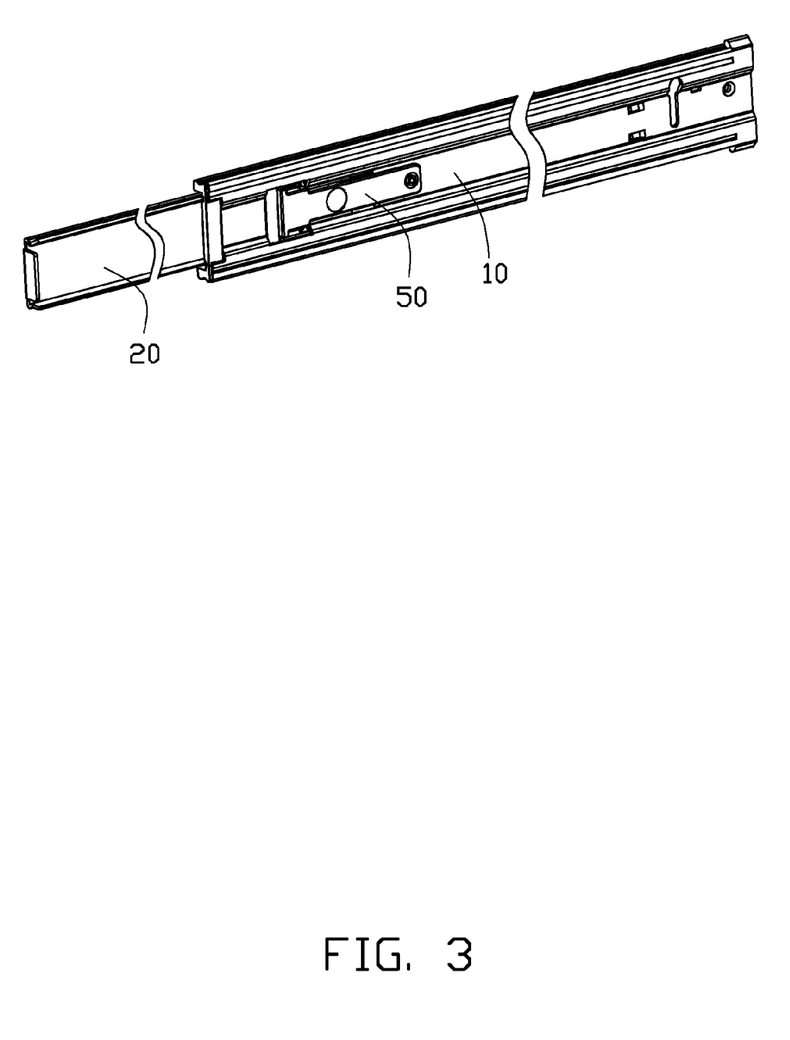
FIG. 3 is an assembled, isometric view of the slide rail assembly of FIG. 1.
Figure 4:
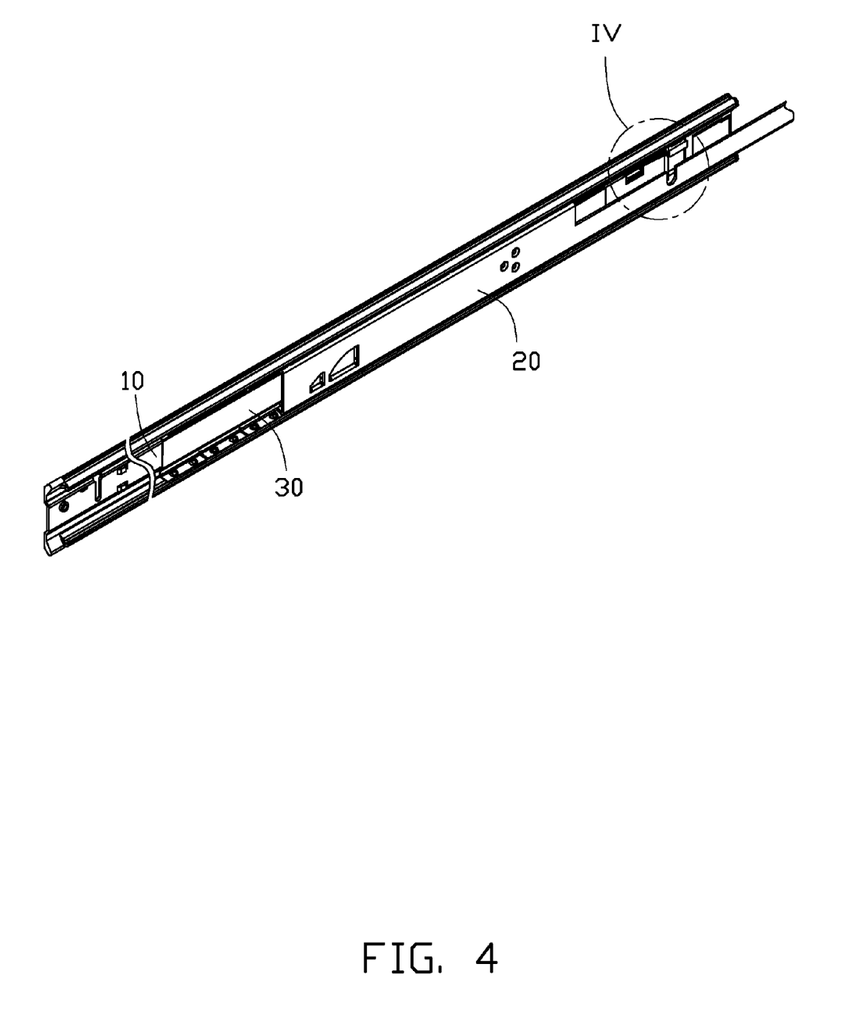
FIG. 4 is an assembled, isometric view of the slide rail assembly of FIG. 2, showing a first state of use.
Figure 5:
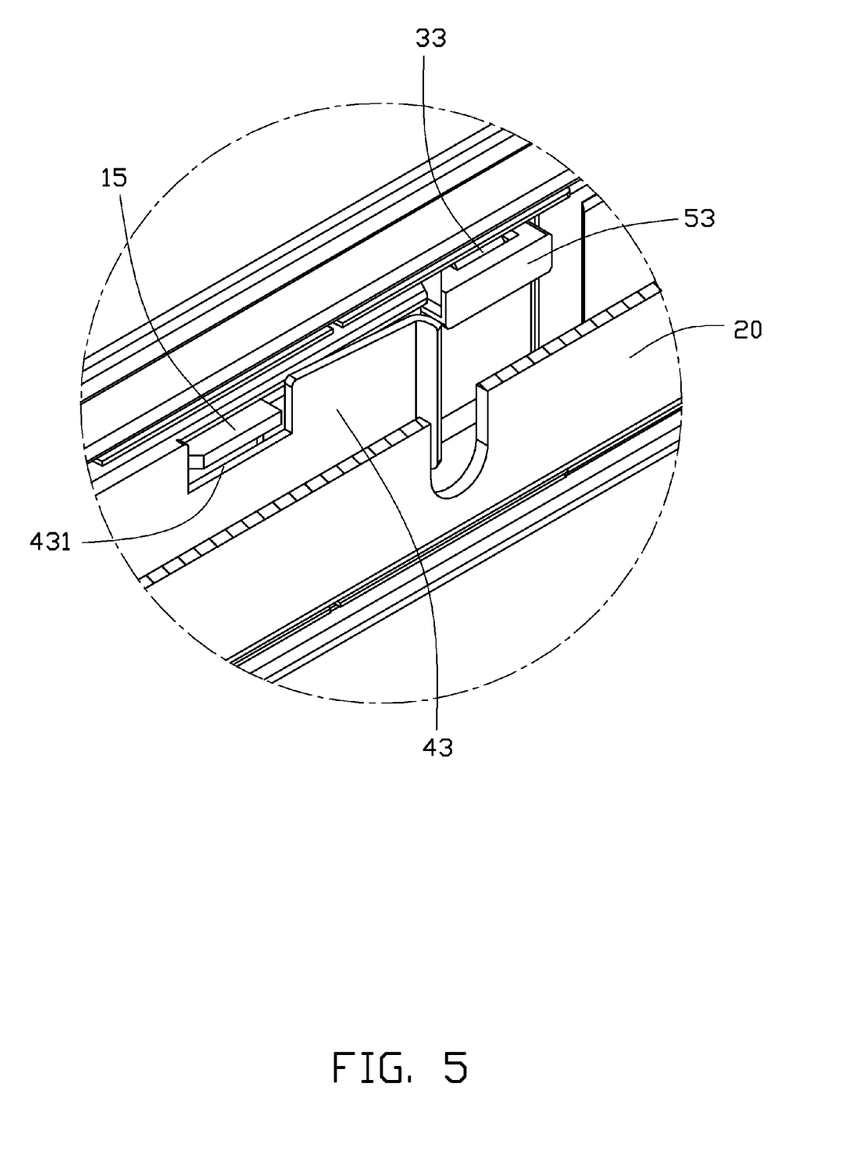
FIG. 5 is an enlarged view of a circled portion IV of FIG. 4.

Referring to FIGS. 3 to 5, in assembly, the mounting portion 41 of the positioning member 40 is fixed to a side of the second slide rail 20 opposing the ball bracket 30, by the mounting poles 21 of the second slide rail 20 extending into the corresponding mounting holes 411 of the positioning member 40. The mounting portion 51 of the locking member 50 is fixed to the first slide rail 10 opposite to the ball bracket 30, by the mounting pole 17 of the first slide rail 10 extending into the mounting hole 52 of the locking member 50. The locking portion 53 and the press portion 55 are positioned in the through hole 13 of the first slide rail 10. The ball bracket 30 is received in the first slide rail 10 opposite to the locking member 50. The blocking portions 33 of the ball bracket 30 ride over the protrusions 535 along the slanted surfaces 537 of the locking member 50 to respectively engage in the locking slots 533. Therefore, the ball bracket 30 is locked to the locking member 50. The opening 311 of the ball bracket 30 aligns with the through hole 13 of the first slide rail 10. The second slide rail 20 is slidably received in the ball bracket 30 opposite to the first slide rail 10. The stoppers 15 of the first slide rail 10 extend through the through hole 13 of the first slide rail 10 and the opening 311 of the ball bracket 30, to respectively engage in the cutouts 431 of the positioning member 40. Therefore, the second slide rail 20 is locked to the first slide rail 10.

Figure 6:
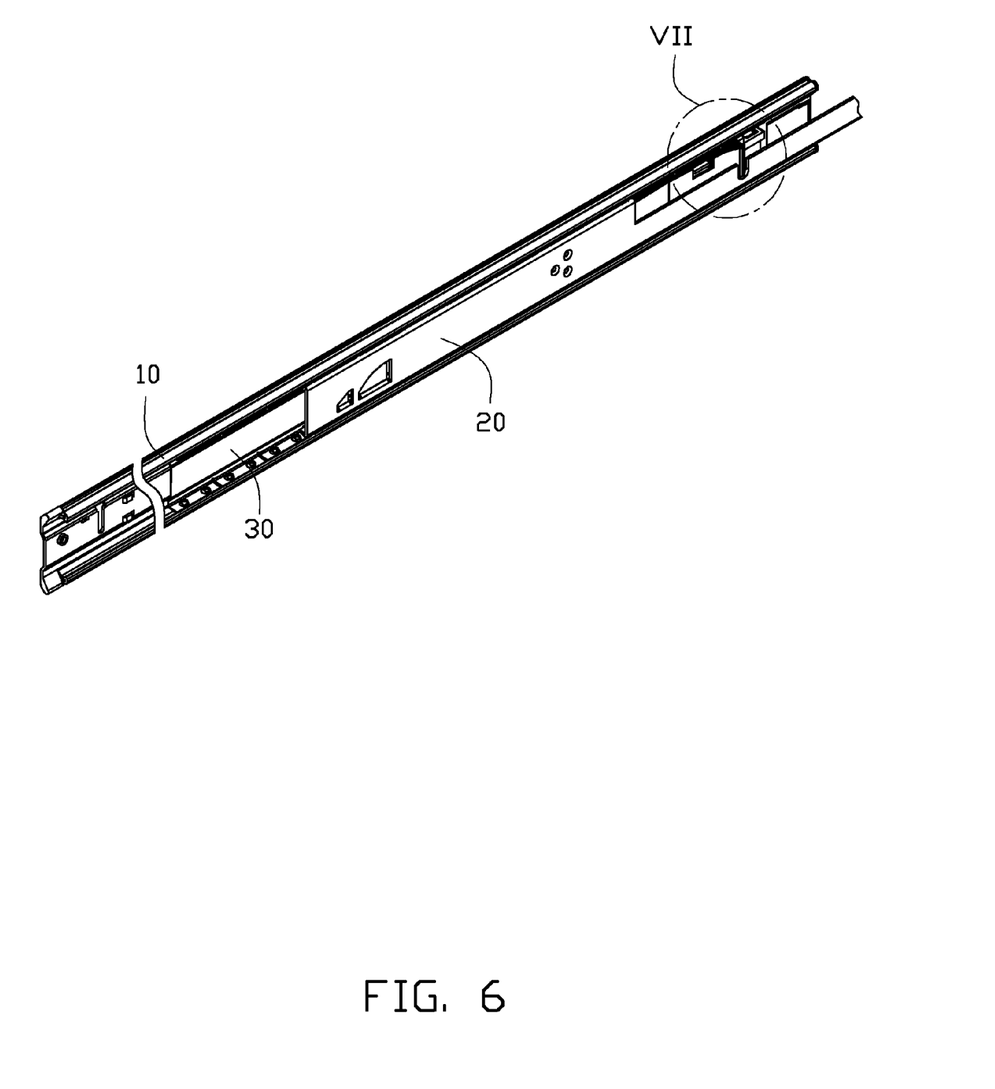
FIG. 6 is similar to FIG. 4, but showing a second state of use.
Figure 7:
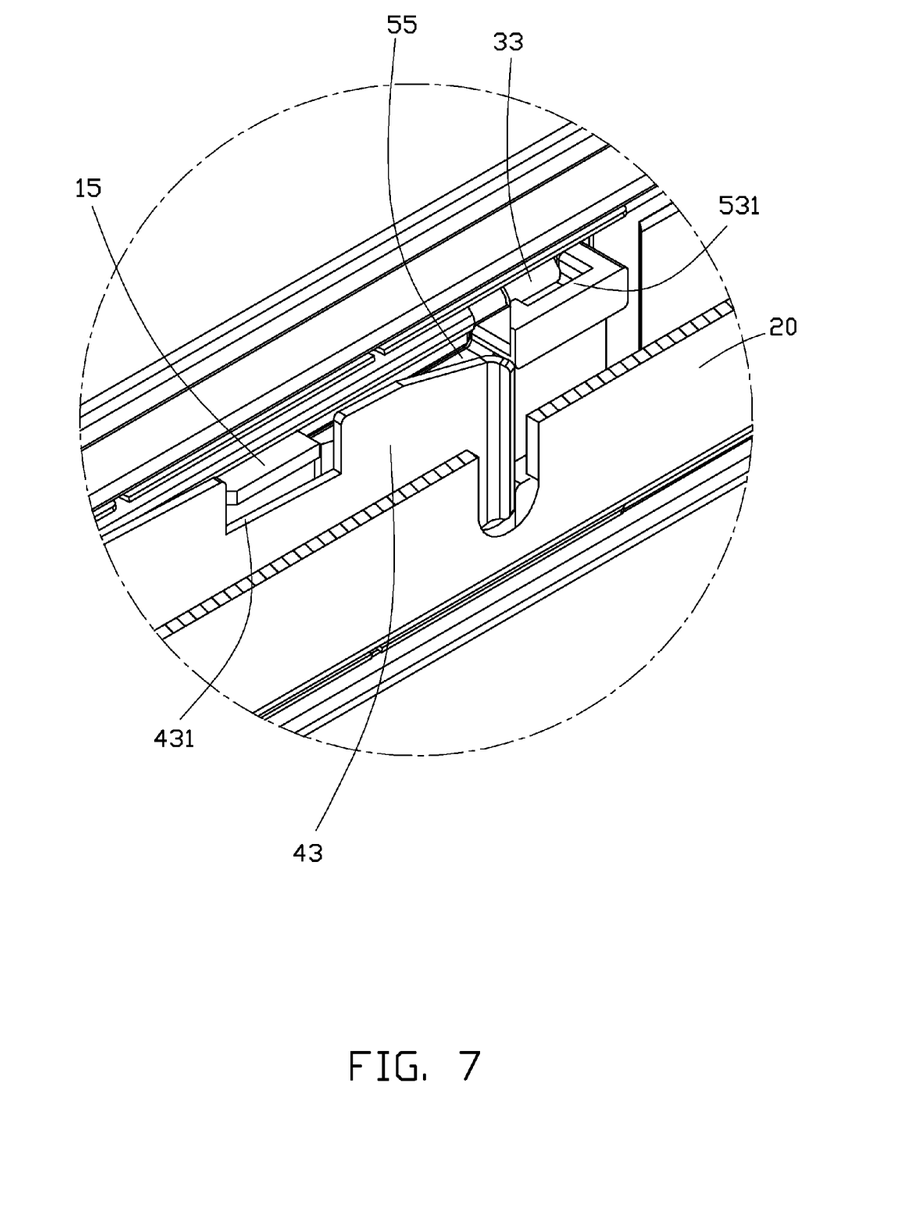
FIG. 7 is an enlarged view of a circled portion VII of FIG. 6.

When moving the second slide rail 20 from the first slide rail 10, an outer surface of the locking portion 53 opposite to the first slide rail 10 is pressed to deform the locking member 50 along a direction perpendicular to the bottom wall 11 of the first slide rail 10 toward the ball bracket 30. The hooks 531 of the locking member 50 are released from the blocking portions 33 of the ball bracket 30. Thus, the ball bracket 30 may be slid relative to the first slide rail 10. At the same time, the press portion 55 of the locking member 50 presses the positioning portion 43 of the positioning member 40 to deform the positioning member 40 along a direction perpendicular to the bottom wall 11 of the first slide rail 10 and away from the first slide rail 10. Thus, the positioning portion 43 of the positioning member 40 is released from the stoppers 15 of the first slide rail 10. Therefore, the second slide rail 20 may be slid relative to the first slide rail 10 at the same time as the ball bracket 30.

The ball bracket 30 and the second slide rail 20 of the slide rail assembly of the present application may be released from the first slide rail 10 at the same time to slide relative to the first slide rail 10.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A slide rail assembly comprising:
   a first slide rail defining a through hole therein, and comprising a stopper adjacent to the through hole;
   a ball bracket slidably received in the first slide rail, the ball bracket defining an opening in an end of the ball bracket, and comprising a blocking portion;
   a second slide rail slidably received in the ball bracket;
   a positioning member fixed to the second slide rail and comprising a positioning portion; and
   a locking member fixed to the first slide rail and comprising a locking portion and a press portion;
   wherein the locking portion of the locking member extends through the through hole of the first slide rail to detachably engage with the blocking portion of the ball bracket, the stopper of the first slide rail extends through the opening of the ball bracket to detachably engage with the positioning portion of the positioning member; and
   wherein when to release the second slide rail from the first slide rail, the locking member is pressed to be deformed to release the locking portion of the locking member from the blocking portion of the ball bracket, the press portion of the locking member presses the positioning member to deform the positioning member to release the positioning portion of the positioning member from the stopper of the first slide rail.

2. The slide rail assembly as described in claim 1, wherein the positioning member is a resilient piece and comprises a mounting portion formed at one end of the positioning member opposite to the positioning portion, the mounting portion is fixed to the second slide rail.

3. The slide rail assembly as described in claim 2, wherein a substantially rectangular-shaped cutout is defined in a side of the positioning portion to receive the stopper of the first slide rail.

4. The slide rail assembly as described in claim 1, wherein the locking member comprises a mounting portion formed at one end of the locking portion opposite to the locking portion, the press portion is formed between the locking portion and the mounting portion.

5. The slide rail assembly as described in claim 4, wherein a hook is formed from the locking portion of the locking member, to engage with the blocking portion of the ball bracket.

6. A slide rail assembly comprising:
   a first slide rail comprising a stopper;
   a ball bracket slidably received in the first slide rail, the ball bracket defining an opening therein and comprising a blocking portion adjacent to the opening;
   a second slide rail slidably received in the ball bracket;
   a positioning member fixed to the second slide rail and comprising a positioning portion; and
   a locking member fixed to the first slide rail, and comprising a locking portion and a press portion;
   wherein the locking portion of the locking member is locked to the blocking portion of the ball bracket, the stopper of the first slide rail extends through the opening of the ball bracket to engage with the positioning portion of the positioning member; and
   wherein when to release the second slide rail from the first slide rail, the locking member is pressed to be deformed to release the locking portion from the blocking portion of the ball bracket, the press portion of the locking member presses the positioning member to deform the positioning member to release the positioning portion of the positioning member from the stopper of the first slide rail.

7. The slide rail assembly as described in claim 6, wherein the positioning member is a resilient piece and comprises a mounting portion formed at one end of the positioning member opposite to the positioning portion, the mounting portion is fixed to the second slide rail.

8. The slide rail assembly as described in claim 7, wherein a cutout is defined in the positioning portion to receive the stopper of the first slide rail.

9. The slide rail assembly as described in claim 6, wherein the locking member comprises a mounting portion formed at one end of the locking portion opposite to the locking portion to be fixed to the first slide rail, the press portion is formed between the locking portion and the mounting portion.

10. The slide rail assembly as described in claim 9, wherein a hook is formed from the locking portion, to engage with the blocking portion of the ball bracket.

11. A slide rail assembly comprising:
    a first slide rail;
    a second slide rail;
    a ball bracket slidably sandwiched between the first and second slide rails;
    a positioning member fixed to the second slide rail and facing the ball bracket; and
    a locking member fixed to the first slide rail and opposite to the ball bracket;
    wherein the ball bracket is locked to the first slide rail by the locking member, the second slide rail is locked to the first slide rail by the positioning member; and
    wherein the locking member is operable to release the ball bracket from the first slide rail while simultaneously releasing the second slide rail from the first slide rail by unlocking the positioning member.

12. The slide rail assembly as described in claim 11, wherein the first slide rail comprises a stopper, the ball bracket defines an opening, the stopper of the first slide rail extends through the opening of the ball bracket to engage with the positioning member.

13. The slide rail assembly as described in claim 12, wherein the ball bracket comprises a blocking portion adjacent to the opening, the locking member comprises a locking portion, the locking portion of the locking member is locked to the blocking portion of the ball bracket.

14. The slide rail assembly as described in claim 11, wherein the positioning member is a resilient piece and comprises a mounting portion and a positioning portion formed at opposite ends of the positioning member, the mounting portion is fixed to the second slide rail, the positioning portion is detachably engage with the first slide rail.

15. The slide rail assembly as described in claim 14, wherein a stopper is formed from the first slide rail, a cutout is defined in the positioning portion to receive the stopper of the first slide rail.

16. The slide rail assembly as described in claim 11, wherein the locking member comprises a mounting portion and a locking portion formed at opposite ends of the locking member, and a press portion formed between the locking portion and the mounting portion.

17. The slide rail assembly as described in claim 16, wherein a hook is formed from the locking portion, to engage with the ball bracket.

18. The slide rail assembly as described in claim 11, wherein the first slide rail defines a through hole and comprises a stopper adjacent to the through hole, the ball bracket defines an opening in an end of the ball bracket and comprises a blocking portion, the locking member comprises a locking portion and a press portion, the locking portion of the locking member extends through the through hole of the first slide rail to be locked to the blocking portion of the ball bracket, the stopper of the first slide rail extends through the opening of the ball bracket to engage with the positioning member.

19. The slide rail assembly as described in claim 18, wherein when to release the second slide rail from the first slide rail, the locking member is pressed to be deformed to release the locking portion from the blocking portion of the ball bracket, the press portion of the locking member presses the positioning member to deform the positioning member to release the positioning member from the stopper of the first slide rail.

\* \* \* \* \*